(12) United States Patent
Ebinger et al.

(10) Patent No.: US 7,997,641 B2
(45) Date of Patent: Aug. 16, 2011

(54) TRUCK CAB MOUNTING ARRANGEMENT

(75) Inventors: Christian Ebinger, Obereisesheim (DE); Martin Merkel, Ehningen (DE); Susanne Schneider, Sindelfingen (DE)

(73) Assignee: Daimler AG, Stuttgart (DE)

( * ) Notice: Subject to any disclaimer, the term of this patent is extended or adjusted under 35 U.S.C. 154(b) by 197 days.

(21) Appl. No.: 12/280,537

(22) PCT Filed: Feb. 9, 2007

(86) PCT No.: PCT/EP2007/001097
§ 371 (c)(1),
(2), (4) Date: Apr. 8, 2009

(87) PCT Pub. No.: WO2007/096060
PCT Pub. Date: Aug. 30, 2007

(65) Prior Publication Data
US 2009/0322122 A1    Dec. 31, 2009

(30) Foreign Application Priority Data

Feb. 22, 2006 (DE) .......................... 10 2006 008 090

(51) Int. Cl.
*B62D 33/067* (2006.01)
(52) U.S. Cl. ......... 296/187.03; 296/187.09; 296/190.05; 296/190.07
(58) Field of Classification Search ............. 296/187.03, 296/187.09, 190.01, 190.04, 190.05, 190.07, 296/190.08, 190.03, 35.2; 180/89.12–89.17; 293/132, 133
See application file for complete search history.

(56) References Cited

U.S. PATENT DOCUMENTS

| 5,906,248 | A | | 5/1999 | Nagaike et al. |
| 6,056,337 | A | * | 5/2000 | Oguri et al. ................... 293/142 |
| 6,109,381 | A | * | 8/2000 | Stuyvenberg et al. ..... 180/89.12 |
| 6,520,565 | B1 | * | 2/2003 | Kjellberg ................. 296/187.09 |
| 6,736,448 | B2 | * | 5/2004 | Hanakawa et al. ...... 296/187.09 |
| 6,837,537 | B2 | * | 1/2005 | Ljungquist et al. ...... 296/187.09 |
| 6,932,397 | B2 | * | 8/2005 | Svendsen et al. ............. 293/117 |
| 7,140,669 | B2 | * | 11/2006 | Bollinger et al. ......... 296/190.07 |
| 7,258,392 | B2 | * | 8/2007 | Frederick et al. ........ 296/187.09 |
| 2004/0104599 | A1 | * | 6/2004 | Svendsen et al. ........ 296/187.09 |
| 2005/0225119 | A1 | * | 10/2005 | Bollinger et al. ........ 296/190.07 |
| 2007/0267893 | A1 | * | 11/2007 | Dammann et al. ....... 296/190.02 |
| 2009/0322122 | A1 | * | 12/2009 | Ebinger et al. ........... 296/190.07 |

FOREIGN PATENT DOCUMENTS

DE    197 33 417 A1    3/1998
(Continued)

OTHER PUBLICATIONS

Japanese Office Action dated May 26, 2010 (Four (4) pages).
International search Report dated May 18, 2007 with English translation of relevant portion (Four (4) pages).

*Primary Examiner* — Glenn Dayoan
*Assistant Examiner* — Gregory Blankenship
(74) *Attorney, Agent, or Firm* — Crowell & Moring LLP

(57) ABSTRACT

A truck with a front mounting of a driver's cab on the truck frame, has a stabilizer rocker coupled by bearing brackets of a supporting arrangement which comprises an energy absorbing device for absorbing impact energy as a consequence of a head on collision of the truck in the region of the driver's cab. The energy absorbing device of the supporting arrangement may be assigned at least one supporting element by which a stabilizer tube of the stabilizer rocker can be supported on the vehicle frame.

18 Claims, 2 Drawing Sheets

FOREIGN PATENT DOCUMENTS

| | | |
|---|---|---|
| DE | 102 21 346 C1 | 10/2003 |
| EP | 0 798 198 A1 | 10/1997 |
| EP | 0 972 700 A2 | 1/2000 |
| JP | 58128971 * 8/1983 | ............... 296/190.05 |
| JP | 58128972 * 8/1983 | ............... 296/190.05 |
| JP | 3-38291 A | 2/1991 |

* cited by examiner

TRUCK CAB MOUNTING ARRANGEMENT

BACKGROUND AND SUMMARY OF THE INVENTION

This application is a national stage of PCT International Application No. PCT/EP2007/096060, filed Feb. 9, 2007, which claims priority under 35 U.S.C. §119 to German Patent Application No. 10 2006 008 090.4, filed Feb. 22, 2006, the disclosure(s) of which is (are) expressly incorporated by reference herein.

The invention relates to an arrangement for mounting a cab on a truck frame.

European patent document EP 0 972 700A2 discloses an apparatus in which a driver's cab is supported on a vehicle frame by a stabilizer rocker. The stabilizer rocker includes a stabilizer tube extending from the front end of the driver's cab, and two stabilizer arms coupled to the stabilizer tube, the two stabilizer arms protruding laterally to the rear of the stabilizer tube. The upper end of a spring damper element, by which the stabilizer rocker or the front end of the driver's cab is resiliently mounted is coupled to the corner region between the stabilizer tube and one of the stabilizer arms. The rear end of each stabilizer arm is coupled via a respective bearing eye to an associated bearing mount which is fastened to the upper side of an assigned longitudinal member of the vehicle frame. The two bearing brackets are fastened flexibly to the vehicle frame and are designed as energy absorbing devices in the event of a collision, such as a head on impact in the region of the driver's cab (i.e. essentially above the vehicle frame) in particular to be able to absorb the impact energy. Accordingly, in the event of a head on collision, if the driver's cab of the truck strikes against another truck, the impact energy introduced via the stabilizer rocker is absorbed in the region of the lateral bearing mounts.

However, a disadvantage of this known energy absorbing device is that the bearing mounts require a very complicated manner of design in order to absorb energy to a sufficient extent. Furthermore, bearing mounts of this type are generally of relatively narrow design as viewed in the longitudinal direction of the vehicle. Therefore deformation travel during the collapse of the bearing mounts is extremely limited. In addition, the lateral bearing arms and the bearing eyes which connect the lateral bearing arms to the respectively associated bearing mounts further require a very complicated manner of design to achieve a desired sequence of deformation.

It is therefore one object of the present invention to provide a truck of the type mentioned above having an energy absorbing device that is constructed more simply.

Another object of the invention is to provide such a truck with an energy absorbing device that achieves a greater deformation travel during a collapse.

Another object of the invention is to provide a truck cab mounting arrangement having with a simplified design.

These and other objects of the invention are achieved by the truck cab mounting arrangement according to the invention, in which the energy absorbing device of the mounting arrangement comprises at least one supporting element to mount a stabilizer tube of the stabilizer rocker to the vehicle frame. That is, according to the invention the front-most part of the stabilizer rocker, such as the stabilizer tube, is directly supported relative to the vehicle frame. As a result, design of lateral stabilizer arms, bearing brackets and bearing eyes arranged in between may be simplified, as the stabilizer tube is mounted on the vehicle frame via the at least one supporting element. Furthermore, the mounting element can be formed an appropriate length such that a favorable force path between the stabilizer tube on the driver's cab side and the vehicle frame can be achieved when impact energy is introduced. The supporting element may be dimensioned to provide a improved deformation travel of the energy absorbing device in a simple manner.

According to the invention, the mounting element may be arranged between the stabilizer tube (which is spring mounted with the driver's cab) and the vehicle frame (which is fixed relative thereto) in such a manner that the bearing movement of the stabilizer rocker or of the stabilizer tube is not impaired.

According to another feature of the invention, two supporting elements may be arranged on an assigned longitudinal member of the vehicle frame. In that fashion, impact energy resulting from a head on collision with little width overlap with the other vehicle may be uniformly distributed to the energy absorbing device and/or the vehicle frame.

An energy absorbing device of the present invention can be realized in a particularly simple manner in that the supporting element may be supported on the vehicle frame and/or on a component connected thereto via a crash box. Thus, an arrangement may be provided, in which crash boxes collapses in the event of a head on impact while the associated supporting elements are not deformed at least in an initial phase of the collision.

By supporting a crash box on the upper side of the associated frame longitudinal member, force may be easily transferred to it. A stop may be coupled to the associated frame longitudinal member at that end of the crash box which faces away from the supporting element, such that impact energy present after the complete collapse of the crash box can be introduced into the frame longitudinal member in a simple manner.

In one embodiment, the mounting element may be configured to allow the stabilizer rocker and/or the stabilizer tube to be able to move freely as it executes its bearing movement. For example, the mounting element may include a slotted guide opening and/or an elongated hole through which the stabilizer tube is guided. In an alternate embodiment, one of a flexible articulation component, a coupling or the like, via which the impact energy in the event of a collision can be transmitted and the free bearing movement of the stabilizer tube can be ensured, can be provided in the region of the supporting element for example at the connecting point to the crash box.

In a further embodiment of the invention, the bearing brackets mounting the stabilizer rocker can be displaced to the rear in the longitudinal direction of the vehicle in the event of a collision. It is therefore possible to essentially displace the entire front driver's cab mounting to the rear if appropriate with the absorption of impact energy. For this purpose, the bearing brackets may be fixed in relation to the frame longitudinal member by connecting means in such a manner that said connecting means can be released or destroyed during an impact induced displacement of the bearing brackets. In yet a further embodiment of the invention, a further energy absorbing device simply may be provided between the bearing brackets and the associated frame longitudinal members and/or components connected thereto such that energy can also be absorbed between the guided bearing brackets and the assigned frame longitudinal members. Energy absorption of this type can be realized by providing predetermined breaking points in the region of the frame longitudinal member or of a component assigned thereto.

Other objects, advantages and novel features of the present invention will become apparent from the following detailed description of the invention when considered in conjunction with the accompanying drawings.

DETAILED DESCRIPTION OF THE DRAWINGS

Figure 1:
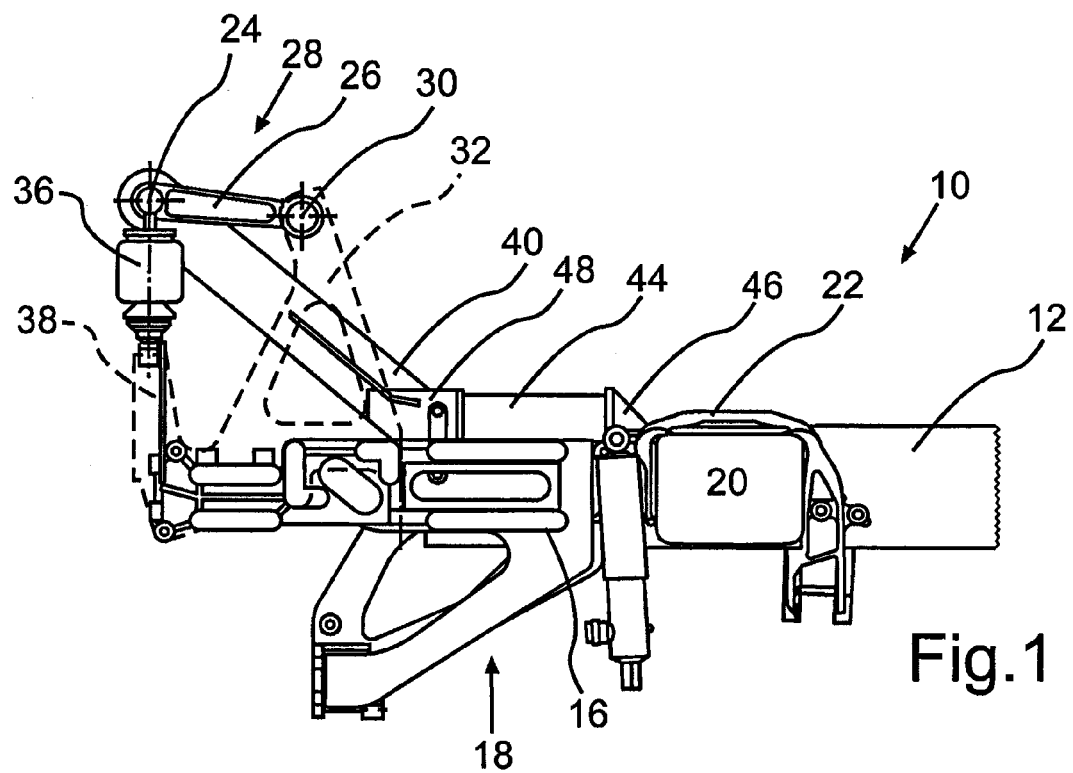
FIG. 1 is a side view of the front end of a truck frame, on the upper side of which a stabilizer rocker of a front driver's cab mounting is held pivotally via associated bearing brackets and is secured via spring damper elements assigned laterally in each case, with an energy absorbing device having guide elements which each run obliquely and associated crash boxes arranged therebehind being provided between a front stabilizer tube and the vehicle frame.
Figure 2:
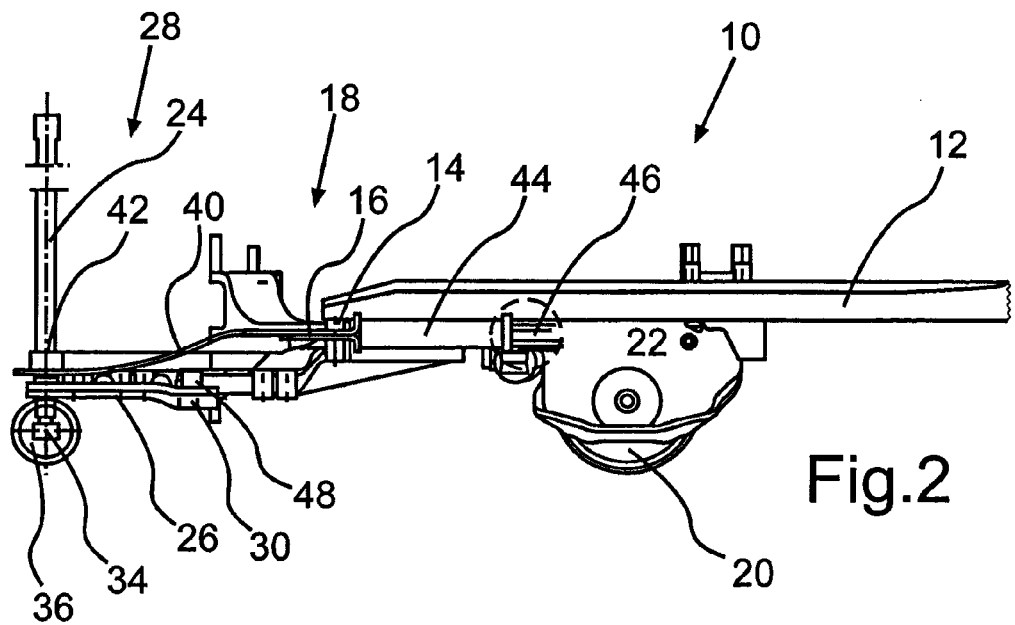
FIG. 2 is a top view of the front end of the vehicle frame with the supporting arrangement for the securing of the stabilizer rocker according to fig. of FIG. 1.

As shown in FIGS. 1 and 2 are respective-schematic side and top views, of the front end of a truck frame 10. (Essentially a left frame longitudinal member 12 as viewed in the forward direction can be seen). A web plate 16 of a forward spring mount 18 is fixed to the outside of the frame longitudinal member by a reinforcing part 14, via bolted connections. The forward spring mount 18 serves, among other things, to secure and support an under ride protector (not shown) of the truck. Behind the forward spring mount 18 (as viewed in the longitudinal direction of the vehicle) an air bellows 20 can be seen. It is assigned to a front axle arrangement, and fastened to the outside of the respective frame longitudinal member 12 by means of an air bellows carrier 22.

A driver's cab (not shown) of the truck may be mounted at its front end on stabilizer tube 24, which forms a stabilizer rocker 28 together with two laterally arranged stabilizer arms 26. The two stabilizer arms 26 are fixedly coupled to the stabilizer tube 24 such that the stabilizer rocker 28 is of substantially U shaped design. The two stabilizer arms 26 may be pivotally mounted via bearing eyes 30 on a respectively associated bearing brackets 32. The latter, may be arranged with a lower end on the web plate 16 of the forward spring mount 18 as described below in more detail with reference to FIG. 3. The outer end of stabilizer tube 24 each comprise bearing eye 34 to which an upper end of a respective spring damper element 36 is coupled. The spring damper elements 36 are coupled by their respectively lower ends to a holding arm 38 of the respectively assigned bearing bracket. In that fashion, stabilizer rocker 28 can therefore be pivoted about the bearing axis formed by the two bearing eyes 30, and extends in the transverse and horizontal directions of the vehicle. Stabilizer rocker 28 may be supported resiliently in relation to the vehicle frame of truck cab mounting arrangement 10 by spring damper elements 36. In this manner, the front mounting of the driver's cab on the stabilizer tube 24, may be ensured. That is, it is held by the two-bearing brackets 32.

In addition to the two laterally arranged bearing brackets 32, the mounting arrangement may include two supporting elements 40 in order to secure the stabilizer rocker 28. The two supporting elements 40 may extend above the web plates 16 of the forward spring mount 18. In the present exemplary embodiment, the supporting elements 40 are designed as reinforced sheet metal elements. The two supporting elements 40 may run obliquely upwards to the front, with their front and upper ends each comprising a slotted guide opening 42 in the form of an elongated hole and through which the stabilizer tube 24 may be guided with play. In particular, the slotted guide openings 42 may be a sufficient vertical length such that the stabilizer tube 24 can spring substantially in the vertical direction in order to execute the bearing movement. The shape of the slotted guide opening 42 may be substantially determined by the radius of the bearing arms 26 which are mounted pivotally about the bearing eye 30. That is, in the present exemplary embodiment, the slotted guide opening 42 must be of slightly curved design such that the stabilizer rocker 28 can correspondingly rock or yield resiliently.

At the end facing away from the stabilizer tube 24, each supporting element 40 is supported on an associated crash box 44 which, for its part, is fastened fixedly on the upper side to the web plate 16 of the forward spring mount 18, which web plate is connected to the respective frame longitudinal member 12. Of course, in this connection, it would also be conceivable for the crash box 44 to be arranged directly on the upper side of the frame longitudinal member 12. At its end facing away from the supporting element 40, the respective crash box 44 is supported on a stop 46 which, in the present exemplary embodiment, is integrated in the air bellows carrier 22 and is fixed via the latter on the correspondingly assigned frame longitudinal member 12. A reinforcement 48 which can be designed, for example, as a flexible articulation component is provided in the corner region between the supporting element 40 and the front end of the associated crash box 44. If an articulation component of this type is provided, then it is possible, for example, to omit the slotted guide opening 42 at the front and upper end of each of the supporting elements 40. In this case, the play required by the stabilizer tube 24 in order to execute the bearing movement is ensured by the articulation component.

As shown in FIG. 2, supporting element 40 (as seen in the transverse direction of the vehicle) is of substantially Z shaped design as seen in the transverse direction of the vehicle. Thus, the two supporting elements 40 widen forward and upward in the transverse direction of the vehicle. In this embodiment, the front end of the supporting element 40 directly adjoins the associated stabilizer arm 26 of the stabilizer rocker 28 on the inside.

Figure 3:
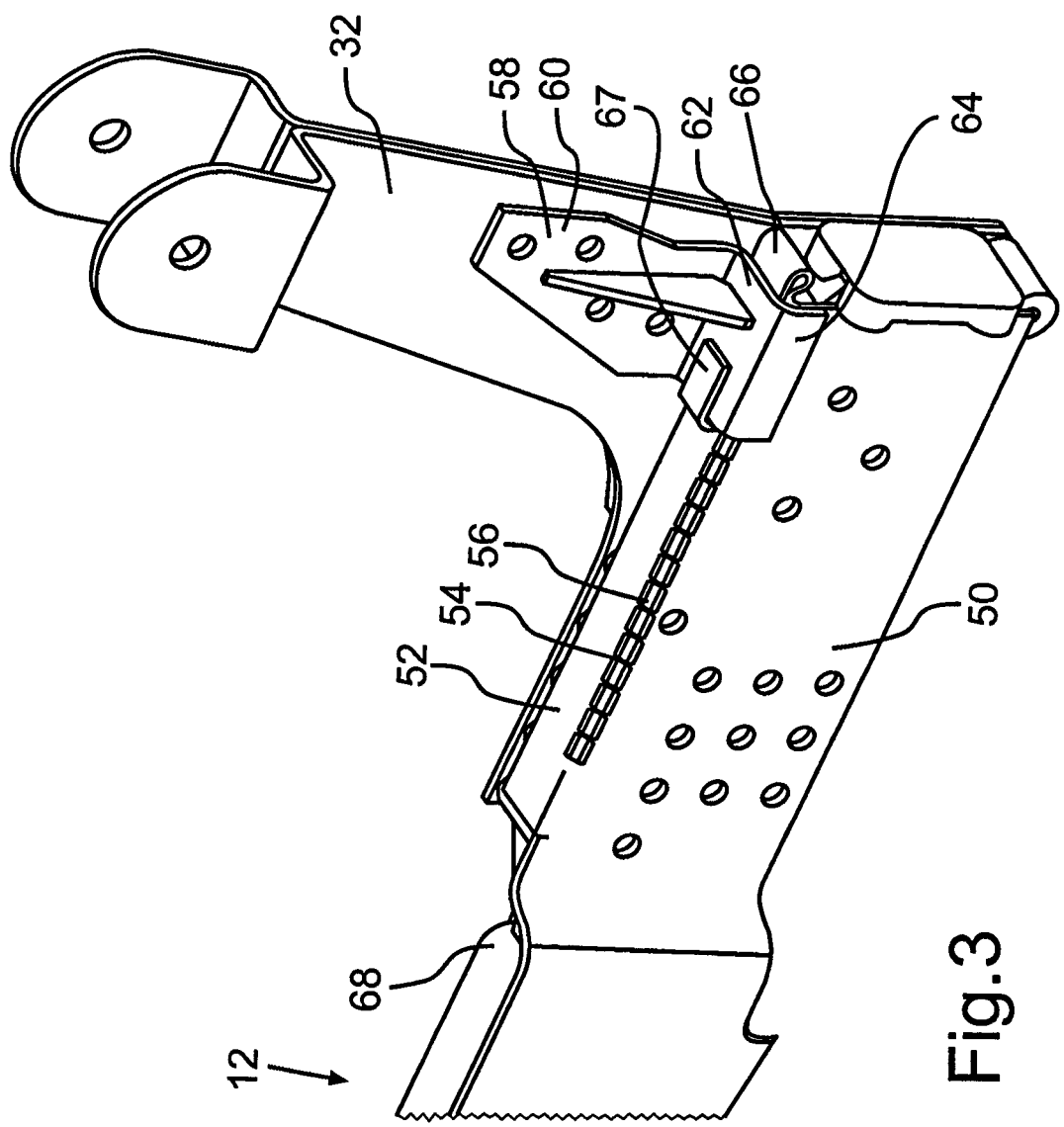
FIG. 3 is a perspective view of an alternatively designed bearing bracket for the pivotal mounting of the stabilizer rocker, with the bearing bracket being displaceable to the rear in the longitudinal direction of the vehicle.

The two bearing brackets 32 may be fastened to respectively associated web plate 16 of the forward spring mount 18 and may be arranged both fixedly and also in a guided manner on the web plate 16. As shown in FIG. 3, an embodiment of the bearing bracket 32 is arranged at the front end of the web plate 16, and extends downward and outwardly to be level with the lower end of the web plate 16. Web plate 16 comprises, at its rear end, a flange 50 which runs in the vertical direction of the vehicle and approximately vertically, with an upper flange 52, which may be formed integrally therewith, running approximately perpendicularly or horizontally with respect to the vehicle. In the corner region between the two flanges 38, 40, a series of predetermined breaking points 54, may be formed by consecutively arranged, substantially rectangular recesses 56 in web plate 16.

Bearing bracket 32 may include guide element 58 which is of substantially "S" shaped configuration on the inside of the bearing bracket 32. Guide element 58 may be fixedly coupled to bearing bracket 32 by contact part 60. Furthermore, guide element 58 may comprise supporting part 62 with which the bearing brackets 32 may be supported on upper flange 52 of web plate 16 in the vertical direction of the vehicle. Supporting part 62 may be adjoined on the lower side by a guide part 64 which runs parallel to or in contact with the vertical flange 50 of the web plate 16 without connecting means toward web plate 16.

The upper flange 52 of the web plate 16 may be designed with greater length to the rear than the vertical flange 50 and to include a bend upward in the region of a turned over portion 66, so that upper flange 52 below the supporting part 62 is of double design, with an upper part of the upper flange 52 resting on a lower part. The upper part may extend as far as dragging lug 67 which engages around the front end of the supporting part 62 of the guide element 58. The bearing bracket 32 is connected to web plate 16 via a stiffening part 68, wherein both of these two parts being arranged together on the web plate 16 via connecting means. In the event of a head on collision and an accident induced displacement back of the bearing bracket 32, according to one embodiment, the connecting means can tear or break at predetermined breaking points, for example at the planar abutting point between the stiffening part 68 and the web plate 16.

According to another embodiment, when the driver's cab or the mounting of the driver's cab together with the stabilizer rocker 28 is subjected as a consequence of a head on impact force acting to the rear in the longitudinal direction of the vehicle, the connecting means between the bearing brackets 32 and the web plate 16 may become detached, such that the bearing brackets 32 can move to the rear. When set into movement, bearing brackets 32 may employ dragging lug 67 to drag the upper part of the upper flange 52. Accordingly, turned over portion 66 of the upper flange 52 may be carried rearward to the first predetermined breaking point 54 over the course of the shifting back of the bearing bracket 32. After a predetermined tearing or breaking force has been overcome, the individual predetermined breaking point 54 may tear or break, the row of predetermined breaking points 56 may be undone from the front to the rear. In this manner, the impact energy acting on the bearing bracket 32 can be largely dissipated.

According to another embodiment, guidance of the bearing bracket both in the vertical direction of the vehicle and in the transverse direction of the vehicle may be ensured by supporting part 62 one of guide part 64 of the guide element 58 which is fixedly coupled to the bearing brackets 32. Thus, the bearing brackets 32 may only undertake a displacement to the rear in the longitudinal direction of the vehicle while maintaining position in the vertical direction of the vehicle and in the transverse direction of the vehicle remains at the same height and width.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A truck having a driver's cab mount comprising:
a stabilizer rocker;
a supporting arrangement that includes a plurality of bearing brackets coupling the stabilizer rocker to a frame of the truck;
the supporting arrangement further includes an energy absorbing device configured to absorb head on collision impact energy as a result of a head on collision in the region of the cab;
wherein the energy absorbing device has at least one supporting element configured to support a stabilizer tube of the stabilizer rocker to the vehicle frame.

2. The truck as claimed in claim 1, wherein the energy absorbing device comprises two supporting elements which are each coupled to a longitudinal member of the vehicle frame.

3. The truck as claimed in claim 1, wherein:
the supporting arrangement includes a crash box; and
each supporting element is supported on one of the frame and a forward spring mount by the crash box.

4. The truck as claimed in claim 3, wherein:
the forward spring mount is coupled to the frame; and
the crash box is supported on one of an upper side of a longitudinal member of the frame and the forward spring mount.

5. The truck as claimed in claim 3, wherein:
the crash box abuts against an assigned stop and;
the assigned stop is fixed on one said longitudinal member and said forward spring mount.

6. The truck as claimed in claim 5, wherein;
the assigned stop is integrated in an air bellows carrier; and
the air bellows carrier is coupled to one of said longitudinal member and said forward spring mount.

7. The truck as claimed in claim 1, wherein the stabilizer tube is moveable in relation to the supporting elements in order to execute a bearing movement.

8. The truck as claimed in claim 7, wherein each supporting element comprises a slotted guide opening through in the stabilizer tube is guided.

9. The truck as claimed in claim 1, further comprising a flexible articulation component is associated with the supporting element.

10. The truck as claimed in claim 1, further comprising a guide assigned to each of the bearing brackets, wherein the plurality of bearing brackets are displaceable to rearwardly in the longitudinal direction of the truck along respectively assigned guides.

11. The truck as claimed in claim 10, wherein:
each of said bearing brackets is fixed via connecting means to a web plate assigned to the respective frame longitudinal member; and
the connecting means is releasable in response to an impact induced displacement of the bearing brackets.

12. The truck as claimed in claim 11, wherein:
each guide comprises a guide clement associated with a bearing bracket; and
the guide element supports the bearing bracket in the vertical direction of the truck and maintains the bearing bracket in the transverse direction of the truck on the associated web plate of the longitudinal member.

13. The truck as claimed in claim 11, wherein the web plate of the respective longitudinal member comprises a row of predetermined breaking points.

14. The truck as claimed in claim 11, wherein the guide elements of the bearing brackets are fixedly coupled to assigned upper flanges of the web plates.

15. A truck cab mounting arrangement for a truck having a front mounted cab, the truck comprising:
a frame;
a stabilizer rocker comprising a stabilizing tube and two laterally arranged stabilizer arms coupled to the stabilizing tube, the stabilizing tube positioned in the front most portion of the stabilizer rocker and configured as a mount for a front end of the cab;
bearing brackets coupled to the stabilizer rocker and the frame, the bearing brackets fixedly coupled to the frame and pivotally coupled to the cab;

an energy absorbing device coupled to the frame and configured to absorb head on collision impact energy in the region of the cab; and two supporting elements each arranged on a longitudinal member of the frame configured to evenly distribute impact energy.

16. The truck cab mounting arrangement as claimed in claim 15, wherein the stabilizer rocker is configured to provide deformation travel of the energy absorbing device.

17. The truck cab mounting arrangement as claimed in claim 15, wherein the bearing brackets are configured to release during impact induced displacement and displace to the rear of the truck.

18. The truck cab mounting arrangement as claimed in claim 15, wherein the frame comprises predetermined breaking points configured to dissipate impact energy of a collision.

* * * * *